(12) United States Patent
Sakitani et al.

(10) Patent No.: US 7,690,460 B2
(45) Date of Patent: Apr. 6, 2010

(54) EXHAUST STRUCTURE OF CONSTRUCTION MACHINE

(75) Inventors: Shintaro Sakitani, Hiroshima (JP); Koji Yonezawa, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 113 days.

(21) Appl. No.: 11/765,744

(22) Filed: Jun. 20, 2007

(65) Prior Publication Data
US 2008/0041332 A1 Feb. 21, 2008

(30) Foreign Application Priority Data
Jun. 30, 2006 (JP) ............... 2006-181583

(51) Int. Cl.
*B60K 11/00* (2006.01)
(52) U.S. Cl. .................... 180/68.1; 180/68.3
(58) Field of Classification Search ............... 180/68.1, 180/68.2, 68.3, 69.2, 69.25, 309; 123/41.49, 123/41.66, 198 E
See application file for complete search history.

(56) References Cited

U.S. PATENT DOCUMENTS

| | | | | | |
|---|---|---|---|---|---|
| 2,881,860 | A | * | 4/1959 | Ternes | 180/68.3 |
| 3,989,415 | A | * | 11/1976 | Van-Hee et al. | 417/312 |
| 4,606,422 | A | * | 8/1986 | Jewett | 180/68.1 |
| 4,646,864 | A | * | 3/1987 | Racchi | 180/69.22 |
| 5,022,479 | A | * | 6/1991 | Kiser et al. | 180/68.3 |
| 5,660,243 | A | * | 8/1997 | Anzalone et al. | 180/68.1 |
| 5,709,175 | A | * | 1/1998 | Carroll | 123/41.49 |
| 6,059,061 | A | * | 5/2000 | Economoff et al. | 180/68.1 |
| 6,408,969 | B1 | * | 6/2002 | Lobert et al. | 180/68.1 |
| 6,655,486 | B2 | * | 12/2003 | Oshikawa et al. | 180/68.1 |
| 6,662,892 | B2 | * | 12/2003 | Falk et al. | 180/68.1 |
| 6,745,860 | B2 | * | 6/2004 | Yabe | 180/68.1 |
| 7,131,422 | B2 | | 11/2006 | Kimura et al. | |

FOREIGN PATENT DOCUMENTS

| | | |
|---|---|---|
| EP | 0 734 892 A2 | 10/1996 |
| EP | 0 734 898 A2 | 10/1996 |
| EP | 1 628 001 A1 | 2/2006 |
| EP | 1 630 379 A1 | 3/2006 |
| GB | 2 358 165 A | 7/2001 |
| JP | 9-156384 | 6/1997 |
| JP | 9-158249 | 6/1997 |
| JP | 2004-330854 | 11/2004 |
| JP | 2005-204670 | 8/2005 |
| JP | 2005-282362 | 10/2005 |

* cited by examiner

*Primary Examiner*—Hau V Phan
(74) *Attorney, Agent, or Firm*—Oblon, Spivak, McClelland, Maier & Neustadt, L.L.P.

(57) ABSTRACT

An upper surface part of an engine guard forming an engine room is formed by a bonnet for opening and closing a maintenance port and a fixed hood. On the lower surface side of the bonnet is disposed a movable duct in a state that when the bonnet is opened the movable duct is moved integrally with the bonnet so as to open the maintenance port. On the lower surface side of the fixed hood, is disposed a fixed duct in a state that when the bonnet is closed one end of the fixed duct is connected to one end of the movable duct in the air flow direction. An exhaust duct is formed by both the movable duct and the fixed duct.

5 Claims, 7 Drawing Sheets

EXHAUST STRUCTURE OF CONSTRUCTION MACHINE

BACKGROUND OF THE INVENTION

1. Field of the Invention

The present invention relates to an exhaust structure for suppressing leakage of engine noise or the like from an exhaust port of an engine room in a construction machine such as a hydraulic excavator.

2. Description of the Related Art

In a hydraulic excavator in FIG. 6, an upper rotating body 2 is rotatably mounted on a crawler type lower traveling body 1, and a working attachment 3 is installed to the upper rotating body 2. On a rear part of the upper rotating body 2, is provided an engine room 5 (refer to FIG. 7) which periphery being covered by an engine guard 4.

In the engine room 5 is installed an engine 6, and on one side of the engine 6 are aligned a heat exchanger such as a radiator 7 and a cooling fan 8 in the horizontal direction. On the other side are installed a hydraulic pump 9 and engine related devices (not shown).

An upper surface part of the engine guard 4 is formed by a bonnet 10 protruding upward in a central part in the horizontal direction, and fixed hoods 11 and 12 fixed on the left side and the right side of the bonnet 10.

The bonnet 10 is openably attached for example as a door type (refer to FIG. 6). By the bonnet 10, a maintenance port 13 for maintenance of the engine 6 and the like is opened and closed.

On one of left and right side walls of the engine guard 4 (on the cooling fan 8 side) is provided an intake port 14, and on the other side is provided an exhaust port 15 respectively. By rotation of the cooling fan 8, the outside air is taken from the intake port 14 into the engine room 5.

This cooling air passes around the heat exchanger such as the radiator 7 and the engine and then is exhausted from the exhaust port 15. The heat exchanger, the engine 6 and the like are cooled by this air flow.

At this point, together with the air, engine noise (engine sound and fan sound) is exhausted from the exhaust port 15 being a cause of the noise.

As a countermeasure for the noise, there is a known technique in which an exhaust duct 17 provided with a sound absorbing material 16 is disposed on the inside of the exhaust port 15 along the air flow as shown in FIG. 7 so that the engine noise can be suppressed by a sound absorbing effect of the exhaust duct 17 (Japanese Patent Laid-Open No. 2005-282362, hereinafter also referred to as THE FIRST RELATED ART).

In this case, the exhaust duct 17 is disposed below the fixed hood 11 avoiding the maintenance port 13 so as not to disturb the maintenance.

Japanese Patent Laid-Open Nos. 2004-330854 and Hei9-156384 disclose a technique in which, as shown in FIG. 8 (the same reference numerals applied to the same parts as in FIG. 7), an exhaust port 18 is provided on one of left and right side walls of the bonnet 10, and an exhaust duct 20 provided with a sound absorbing material 19 is attached on the lower surface side of the bonnet 10 facing the exhaust port 18 so that by moving the exhaust duct 20 integrally with the bonnet 10 the maintenance port 13 is opened when the bonnet is opened (hereinafter also referred to as THE SECOND RELATED ART).

In this case, the exhaust duct 20 is disposed in a length range not longer than a port width of the maintenance port 13 so as not to disturb open and close of the bonnet 10.

However, as mentioned above, in a view of ensuring maintenance performance, there are a limitation in which the exhaust duct 17 does not largely interrupt the maintenance port 13 in THE FIRST RELATED ART and a limitation in which a length of the exhaust duct 20 is not longer than the port width of the maintenance port 13 in THE SECOND RELATED ART. As a result, in both cases, it is not possible to have a long duct length. Therefore, a sound absorbing effect by the exhaust ducts 17 and 20 becomes insufficient.

It should be noted that Japanese Patent Laid-Open No. 2005-282362 proposes a technique in which ducts are disposed below both the fixed hood and the bonnet. However, in this case, since two ducts are independently disposed and overlapped as one on the upper side and the other on the lower side, an upper space of the engine room 5 is largely interrupted by the upper duct and the lower duct. Therefore, it is difficult to apply the technique to a small type excavator in which overall height thereof is limited.

SUMMARY OF THE INVENTION

It is an object of the present invention to provide an exhaust structure of a construction machine in which while ensuring maintenance performance a duct length can be made sufficiently long, and there is no fear that an upper space of an engine room is largely interrupted by an exhaust duct.

Firstly, the exhaust structure of the construction machine according to the present invention has the following basic construction.

That is, the exhaust structure of the construction machine according to the present invention comprises an engine guard forming an engine room in which an engine, a heat exchanger and a cooling fan are installed and the engine guard has an exhaust port. The exhaust structure also comprises an exhaust duct for absorbing sound disposed in the engine room, and the exhaust duct is constructed such that the air taken from the exterior into the engine room by the cooling fan passes around the heat exchanger and the engine and through the exhaust duct, and then is exhausted from the exhaust port to the exterior. The exhaust structure further comprises a bonnet for opening and closing a maintenance port, and a fixed hood, the bonnet and the fixed hood forming an upper surface part of the engine guard. A movable duct disposed on the lower surface side of the bonnet is provided in a state that when the bonnet is opened, the movable duct is moved integrally with the bonnet so as to open the maintenance port. A fixed duct is disposed on the lower surface side of the fixed hood, and the fixed duct is provided in a state that when the bonnet is closed, one end of the fixed duct is connected to one end of the movable duct in the air flow direction. The exhaust duct is formed by the movable duct and the fixed duct.

According to the present invention, since a series of exhaust duct is formed by both the movable duct and the fixed duct, it is possible to have a long duct length.

Further, since when the bonnet is opened the movable duct is moved integrally so as to open the maintenance port, it is possible to perform maintenance of devices within the engine room without any trouble.

That is, while ensuring the maintenance performance, it is possible to obtain a high sound absorbing effect.

Moreover, since both the movable duct and the fixed duct are connected in the air flow direction, there is no fear that the upper space of the engine room is largely interrupted by the ducts unlike the case where the ducts are separately disposed as one on the upper side and the other on the lower side (THE FIRST RELATED ART).

Further, since the fixed duct is located below the fixed hood and the movable duct is located below the bonnet respectively, it is possible to suppress upward leakage of engine noise and pump noise by the both ducts (exhaust duct).

DESCRIPTION OF THE PREFERRED EMBODIMENTS

Embodiments of the present invention will be described with reference to FIGS. 1 to 5.

Figure 6:
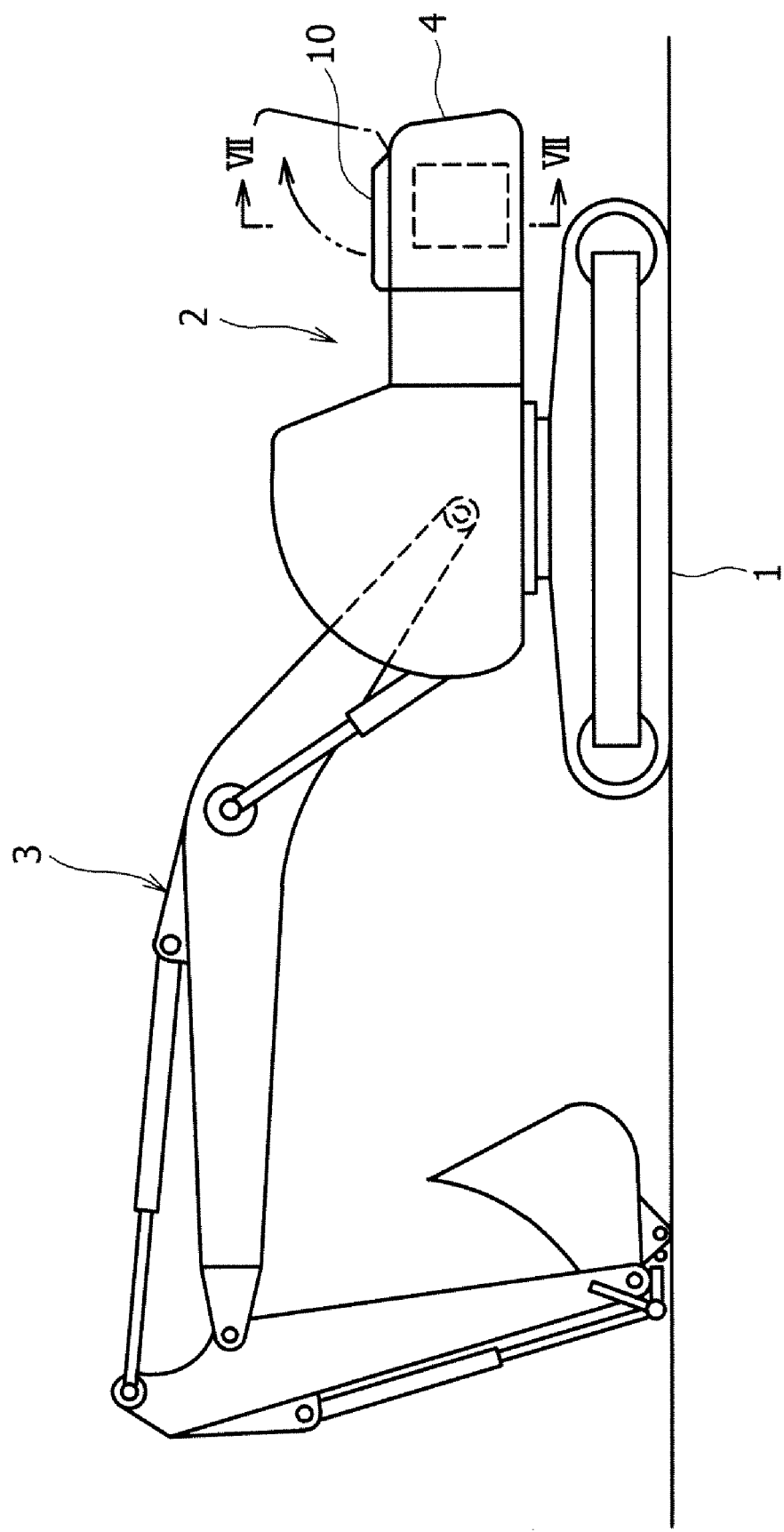
FIG. 6 is a schematic side view of a hydraulic excavator.

Hereinafter, in order to make it easy to compare with THE RELATED ART, device arrangement within an engine room in the case where the present invention is applied to a hydraulic excavator in FIG. 6 will be shown.

Figure 1:
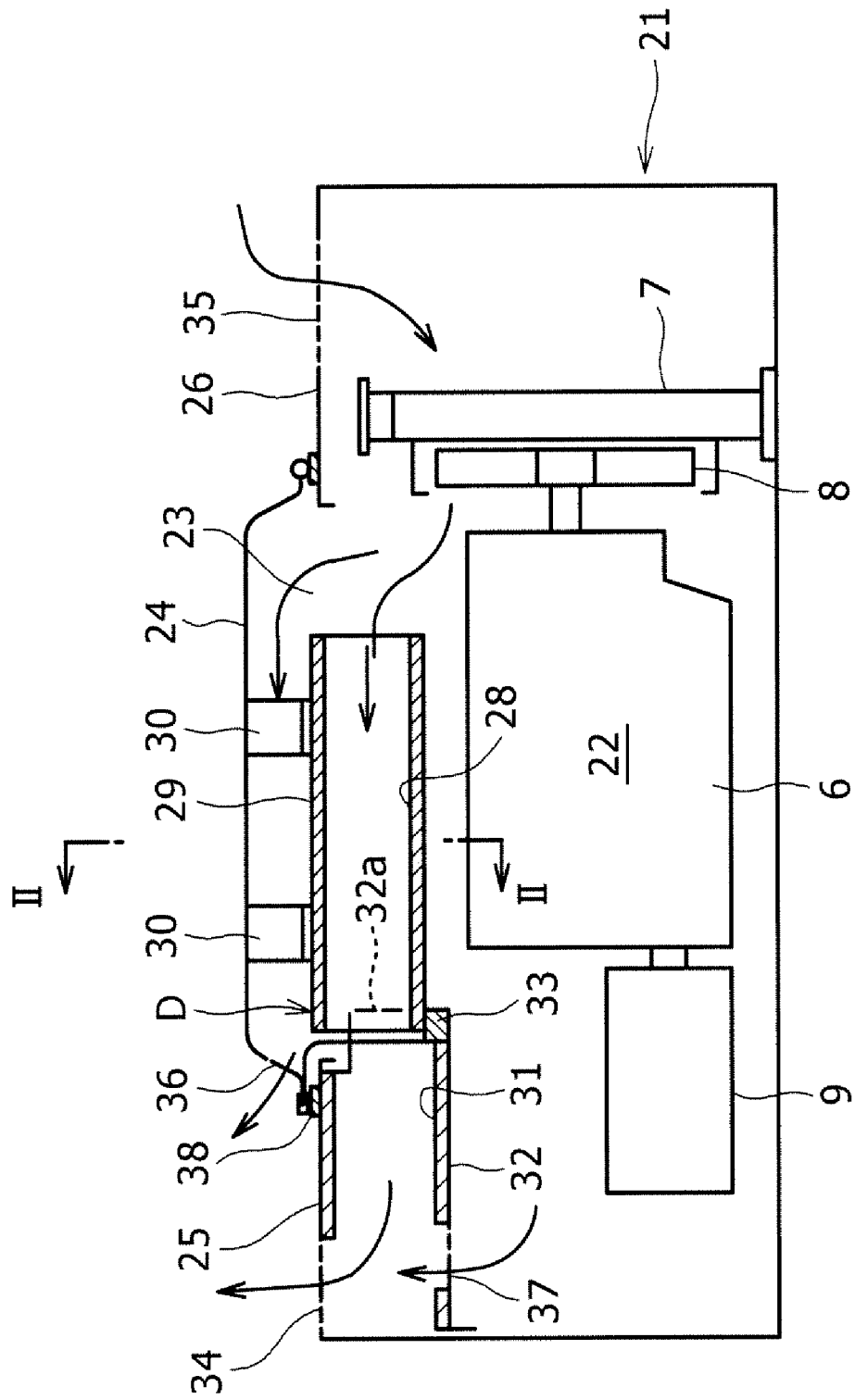
FIG. 1 is a schematic sectional view showing an exhaust structure of a hydraulic excavator according to a first embodiment of the present invention.
Figure 2:
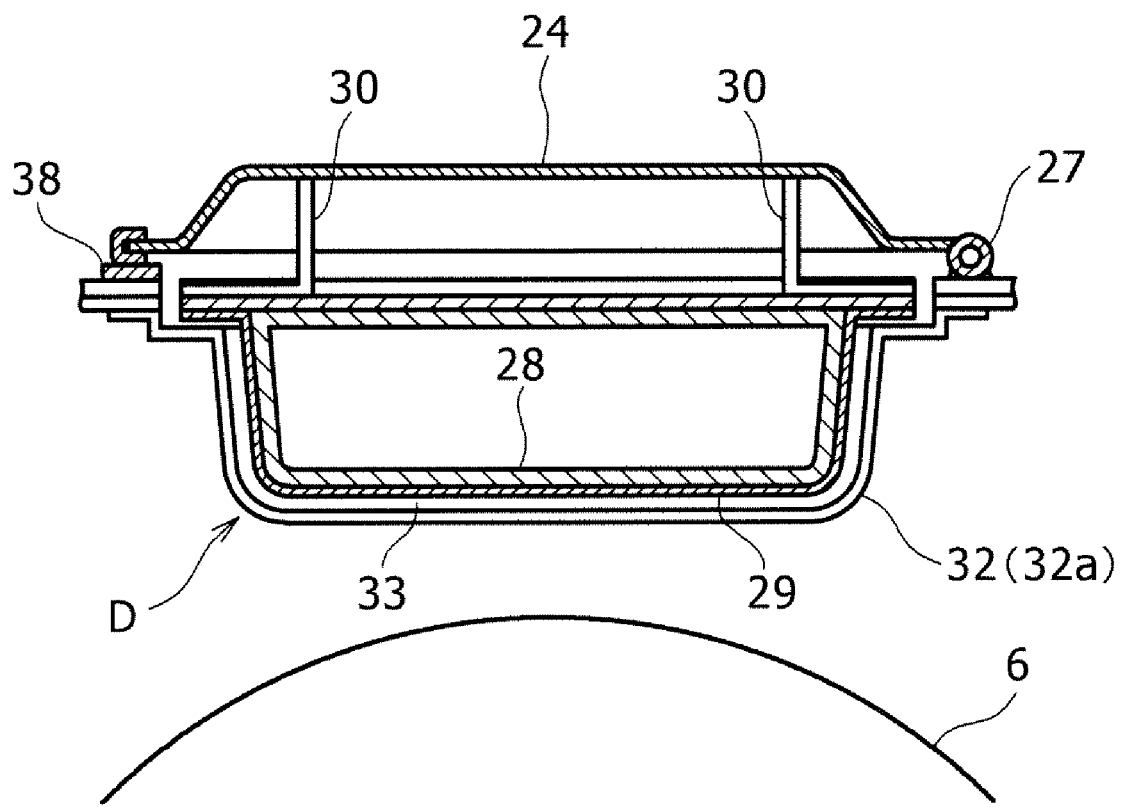
FIG. 2 is an enlarged sectional view by line II-II of FIG. 1.
Figure 3:
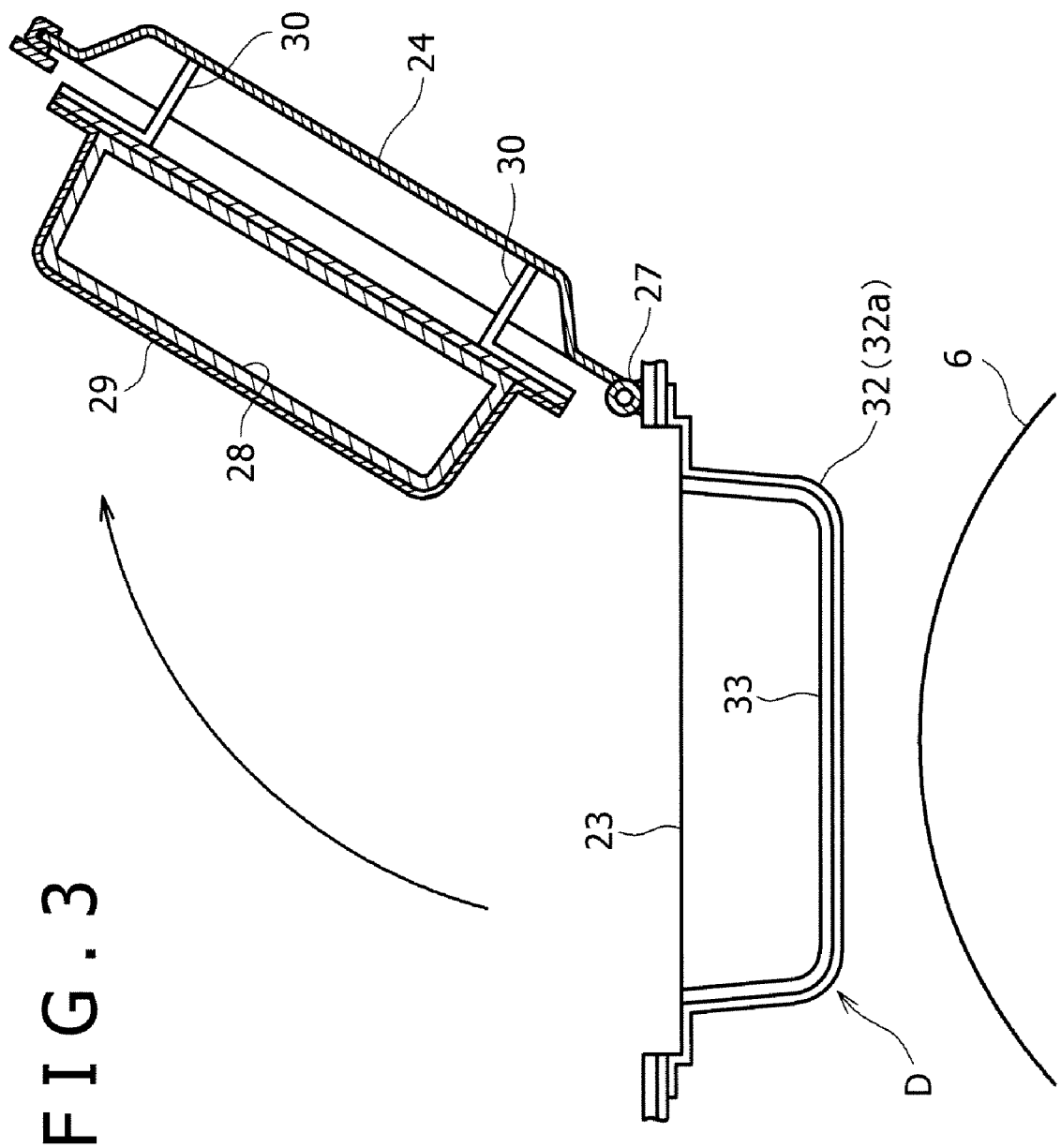
FIG. 3 is a view corresponding to FIG. 2 of a state that a bonnet is opened in the state of FIG. 2.

First Embodiment (Refer to FIGS. 1 to 3)

Figure 7:
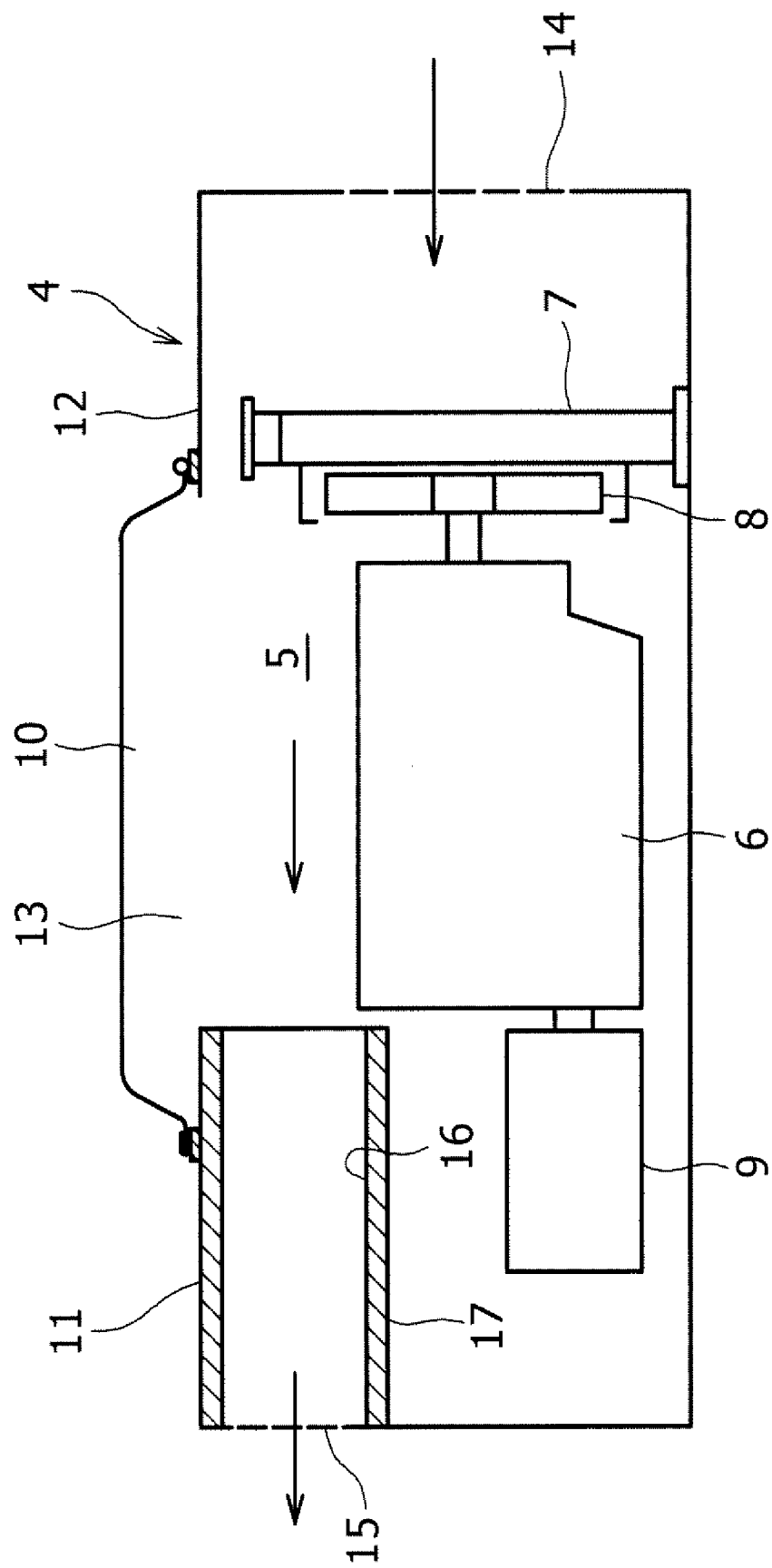
FIG. 7 is an enlarged sectional view by line VII-VII of FIG. 6 showing an exhaust structure of THE RELATED ART.
Figure 8:
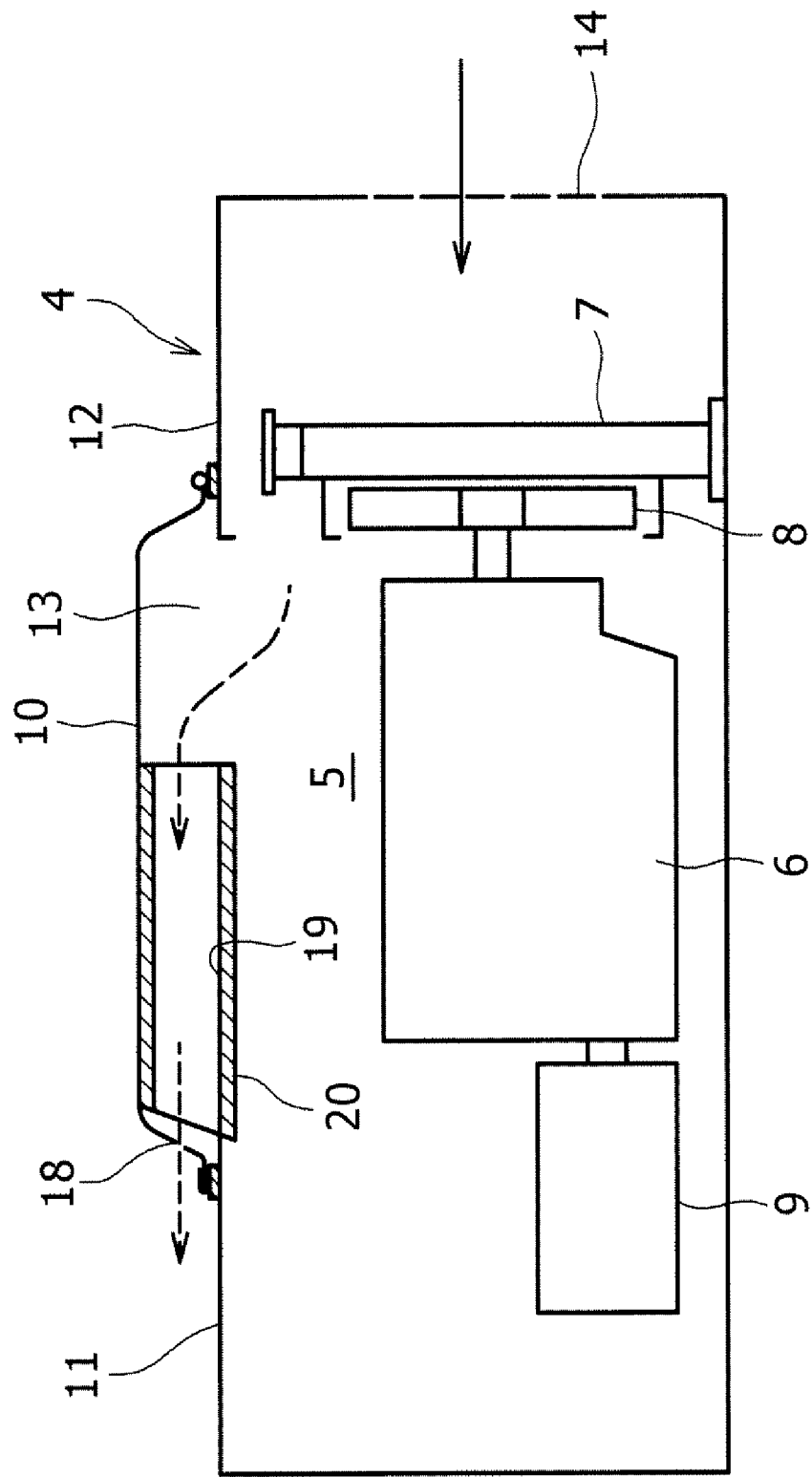
FIG. 8 is a schematic sectional view showing other exhaust structure of THE RELATED ART.

As shown in FIG. 1, a point that an engine room 22 is formed by an engine guard 21 on a rear part of an upper rotating body, a point that in the engine room 22 are installed an engine 6, a heat exchanger such as a radiator 7, a cooling fan 8, a hydraulic pump 9 and engine related devices (not shown), and a point that an upper surface part of the engine guard 21 is formed by a bonnet 24 for opening and closing a maintenance port 23 and fixed hoods 25 and 26 provided on the left side and the right side of the bonnet are the same as THE RELATED ART shown in FIGS. 7 and 8.

The bonnet 24 is rotatably attached for example as a door type taking a hinge member 27 (shown in FIGS. 2 and 3) provided on the rear side as a support point. Meanwhile, on the lower surface side of the bonnet 24, is attached a movable duct 29 provided with a sound absorbing material 28.

The movable duct 29 is formed in a cylindrical shape having upper, lower, front and back peripheral walls, and an upper surface thereof is suspended to the bonnet 24 by the suitable number of attachments 30 (two attachments in the figure).

By this, the movable duct 29 is moved integrally with the bonnet 24 to the outside of the engine room 22 when the bonnet is opened so as to open the maintenance port 23.

Meanwhile, on the lower surface side of the fixed hood 25 adjacent to the bonnet 24 on the left side, is disposed a fixed duct 32 provided with a sound absorbing material 31. When the bonnet is closed, one end of the movable duct 29 and one end of the fixed duct 32 are connected in the air flow direction so as to form an exhaust duct D.

It should be noted that the fixed duct 32 may be formed in a cylindrical shape having four peripheral walls as in the movable duct 29 and an upper surface thereof may be attached to the fixed hood 25. The fixed duct 32 may also be formed in a U shape seen from the side having three lower, front and back walls and attached to the fixed hood 25 in a state that the fixed hood 25 serves as an upper surface wall thereof.

A bottom wall and side walls of an end of the fixed duct 32 to be connected to the movable duct 29 are extended to the movable duct side. By this, a movable duct receiving portion 32a in a U shape seen from the side overlapping an end of the movable duct from the outside when the bonnet is closed is formed.

By the movable duct receiving portion 32a, when the bonnet is closed, the end of the movable duct 29 is automatically connected to the fixed duct 32.

On the inner surface side of the movable duct receiving portion 32a, is provided a duct sealing material 33. By the duct sealing material 33, a connected portion of both the ducts 29 and 32 is sealed. That is, leakage of the air (engine noise) from the connected portion is prevented.

Meanwhile, on the fixed hood 25 on the left side is provided an exhaust port 34 communicating with the inside of the fixed duct 32, and on the fixed hood 26 on the right side is provided an intake port 35 for taking in the outside air.

Further, in order to enhance exhaust performance, on the bonnet 24 is also provided an auxiliary exhaust port 36, and on the bottom wall of the fixed duct 32 is provided an air induction port 37 for introducing the air within the engine room 22 into the fixed duct 32 on the most downstream side and guiding the air to the exhaust port 34.

On a lower surface of a peripheral part of the bonnet 24, is provided a bonnet sealing material 38 for sealing between the bonnet and a maintenance port peripheral part including the fixed hoods 25 and 26 on the both sides.

FIG. 3 shows a state that the bonnet 24 is opened. At this time, as shown in the figure, the movable duct 29 is moved integrally with the bonnet 24 so as to open the maintenance port 23. Therefore, it is possible to perform maintenance of the engine 6 and the like from the maintenance port 23 without any trouble.

When the bonnet 24 is closed in this state, as shown in FIGS. 1 and 2, the movable duct 29 is returned to the inside of the engine room 22 and connected to the fixed duct 32 so that a series of the exhaust duct D is formed.

By the exhaust duct D, the cooled air is guided into the exhaust port 34 and the engine noise is absorbed.

According to the exhaust structure, since a series of the exhaust duct D is formed by both the movable duct 29 and the fixed duct 32, it is possible to have a long duct length.

Further, when the bonnet 24 is opened, the movable duct 29 is moved integrally so as to entirely open the maintenance port 23. Therefore, it is possible to perform the maintenance of devices within the engine room without any trouble.

That is, while ensuring the maintenance performance, it is possible to obtain a high sound absorbing effect.

Both the movable duct 29 and the fixed duct 32 are connected in the air flow direction (horizontal direction). Therefore, there is no fear that an upper space of the engine room 22 is largely interrupted by the duct D unlike the case where the ducts are separately disposed as one on the upper side and the other on the lower side (THE FIRST RELATED ART).

Further, the fixed duct 32 is located below the fixed hood 25 and the movable duct 29 is located below the bonnet 24 respectively, and a duct length including both the ducts can be made long. Therefore, it is possible to cover the upper side of the engine room in a wide range. Specifically, the engine 6 and the hydraulic pump 9 are covered by the exhaust duct D from the upper side.

Therefore, it is possible to effectively suppress upward leakage of the engine noise and pump noise by the exhaust duct D.

In addition, when the bonnet 24 is closed, the end of the movable duct 29 is received by the movable duct receiving portion 32a of the fixed duct 32 and both the ducts 29 and 32 are automatically connected. Therefore, there is no need for extra operations for connection and separation.

Moreover, in this state, it is possible to seal the connected portion of both the ducts 29 and 32 by the duct sealing material 33. Therefore, in spite of connection-separation type, it is possible to prevent the leakage of the air (engine noise) and enhance the sound absorbing effect.

It should be noted that the duct sealing material 33 may be attached to not on the fixed duct 32 (movable duct receiving portion 32a) side, but on the movable duct 29 side.

Figure 4:
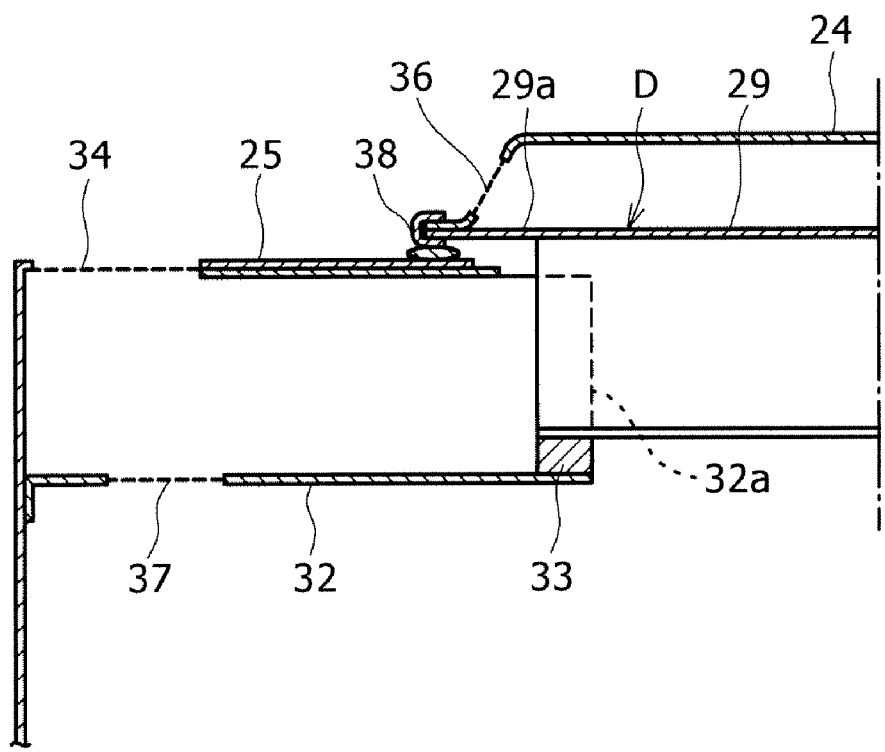
FIG. 4 is a partial sectional view showing an exhaust structure of a hydraulic excavator according to a second embodiment of the present invention.
Figure 5:
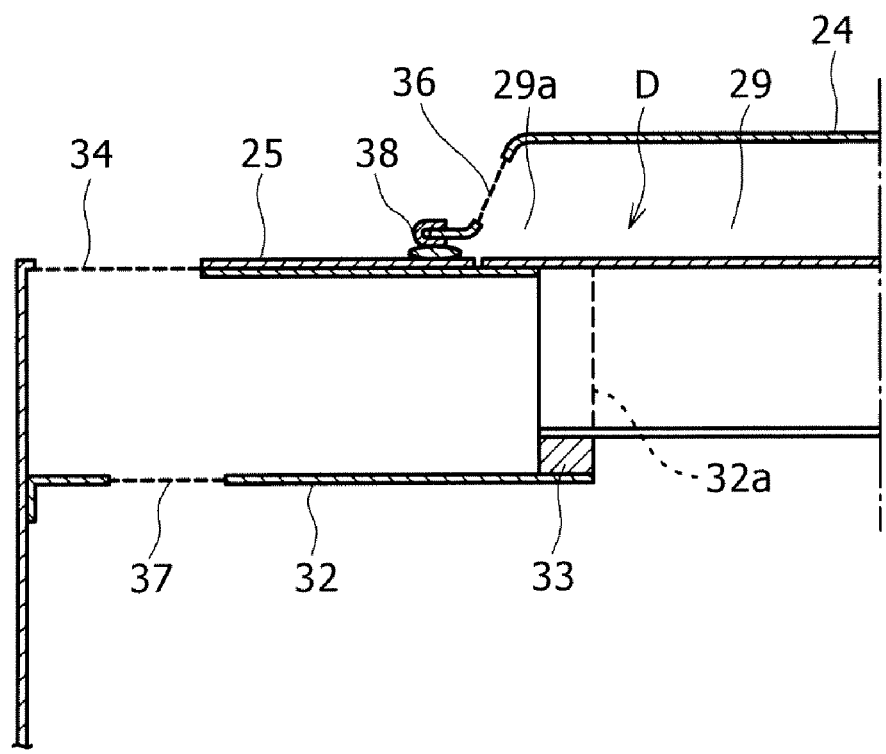
FIG. 5 is a partial sectional view showing an exhaust structure of a hydraulic excavator according to a third embodiment of the present invention.

Second and Third Embodiments (Refer to FIGS. 4 and 5)

Only different points from First Embodiment will be described.

According to First Embodiment, since there is a gap on the upper surface side of the connected portion of both the movable duct 29 and the fixed duct 32 as shown in FIG. 1, the upward leakage of the air from the gap is generated.

Therefore, in Second and Third Embodiments, an upper surface wall of the end of the movable duct 29 on the connecting side to the fixed duct is extended to the fixed duct side (the numeral 29a denotes an extended portion thereof). In Second Embodiment, an end of the extended portion 29a is connected to an end of the bonnet, and in Third Embodiment, an upper surface of the end of the fixed duct is overlapped by the extended portion 29a when the bonnet is closed.

It should be noted that in Third Embodiment, the fixed duct 32 is formed in a cylindrical shape as shown in the figure, and an upper surface wall thereof may be overlapped by the extended portion 29a. The fixed duct 32 is formed in a U shape seen from the side, the fixed hood 25 also serving as the upper surface wall of the fixed duct 32 is extended to the movable duct 29 side, and hence an extended portion thereof may be overlapped by the extended portion 29a on the movable duct side.

Here, in order to make it easy to understand a duct construction, the sound absorbing materials 28 and 31 in FIG. 1 are omitted in FIGS. 4 and 5.

In this construction, it is possible to prevent the upward leakage of the air from the connected portion of both the ducts 29 and 32 by the sealing material 38 in Second Embodiment and by an overlapped portion in Third Embodiment respectively.

In this case, a point that the fixed duct 32 is provided with the movable duct receiving portion 32a is the same as First Embodiment. By combination of the point and the above-mentioned construction, it is possible to enhance an air-leakage preventing effect over the entire connected portion.

It should be noted that in Third Embodiment, by providing a sealing material in the vicinity of an edge of the extended portion 29a or the like, air leakage efficiency of the overlapped portion may be further enhanced and the generation of damage and a gap caused by vibration due to contact between metals may be prevented.

The bonnet 24 may be formed so as to be opened and closed in a sliding type, or a detachable type.

Further, the present invention can widely be applied not only to the hydraulic excavator, but also to various construction machines including a crusher and a disassemble machine which are formed on the basis of the hydraulic excavator.

Although the invention has been described with reference to the preferred embodiments in the attached figures, it is noted that equivalents may be employed and substitutions made herein without departing from the scope of the invention as recited in the claims.

We claim:

1. An exhaust structure of a construction machine, comprising:

an engine guard forming an engine room in which an engine, a heat exchanger and a cooling fan are installed, the engine guard having an exhaust port;

an exhaust duct for absorbing sound disposed in said engine room, the exhaust duct being constructed such that the air taken from the exterior into said engine room by said cooling fan passes around said heat exchanger and said engine and through said exhaust duct, and then is exhausted from said exhaust port to the exterior;

a bonnet for opening and closing a maintenance port, and a fixed hood, the bonnet and the fixed hood forming an upper surface part of said engine guard;

a movable duct disposed on the lower surface side of said bonnet, the movable duct being provided in a state that when said bonnet is opened, the movable duct is moved integrally with said bonnet so as to open said maintenance port; and a fixed duct disposed on the lower surface side of said fixed hood, the fixed duct being provided in a state that when said bonnet is closed, one end of the fixed duct is serially connected to one end of said movable duct in the air flow direction, wherein said exhaust duct is formed by said movable duct and said fixed duct.

2. The exhaust structure of the construction machine according to claim 1, wherein said bonnet is constructed openably by a hinge member, and by an opening and closing movement of said bonnet, one end of said movable duct is separated from and connected to one end of said fixed duct.

3. The exhaust structure of the construction machine according to claim 1, further comprising a movable duct receiving portion overlapping an end of said movable duct from the outside when said bonnet is closed, wherein said movable duct receiving portion includes bottom wall and side walls of one end of said fixed duct extended to the movable duct.

4. The exhaust structure of the construction machine according to claim 1, further comprising:

a duct sealing material for sealing both said fixed duct and said movable duct, the duct sealing material being provided between a movable duct receiving portion of said fixed duct and an end of said movable duct overlapped by said movable duct receiving portion.

5. An exhaust structure of a construction machine, comprising:

an engine guard forming an engine room in which an engine, a heat exchanger and a cooling fan are installed, the engine guard having an exhaust port;

an exhaust duct for absorbing sound disposed in said engine room, the exhaust duct being constructed such that the air taken from the exterior into said engine room by said cooling fan passes around said heat exchanger and said engine and through said exhaust duct, and then is exhausted from said exhaust port to the exterior;

a bonnet for opening and closing a maintenance port, and a fixed hood, the bonnet and the fixed hood forming an upper surface part of said engine guard;

a movable duct disposed on the lower surface side of said bonnet, the movable duct being provided in a state that when said bonnet is opened, the movable duct is moved integrally with said bonnet so as to open said maintenance port; and a fixed duct disposed on the lower surface side of said fixed hood, the fixed duct being provided in a state that when said bonnet is closed, said fixed duct and movable duct are arranged substantially coaxially such that one end of the fixed duct is connected to one end of said movable duct in the air flow direction, wherein said exhaust duct is formed by said movable duct and said fixed duct.

* * * * *